US 008301665B2

(12) United States Patent
Sieb

(10) Patent No.: US 8,301,665 B2
(45) Date of Patent: Oct. 30, 2012

(54) ACCELERATED DRILL-THROUGH ON ASSOCIATION RULES

(75) Inventor: Christoph Sieb, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 12/875,845

(22) Filed: Sep. 3, 2010

(65) Prior Publication Data

US 2011/0060765 A1 Mar. 10, 2011

(30) Foreign Application Priority Data

Sep. 8, 2009 (EP) .................................. 09169735

(51) Int. Cl.
*G06F 7/00* (2006.01)
*G06F 17/00* (2006.01)
(52) U.S. Cl. .................... 707/797; 707/829; 705/26.63; 705/26.7
(58) Field of Classification Search .................. 707/797, 707/E17.012, E17.05, E17.087, 665, 694, 707/829, 776; 705/26.63, 26.7
See application file for complete search history.

(56) References Cited

U.S. PATENT DOCUMENTS

| 5,283,894 | A  | * | 2/1994  | Deran ............................ 707/797 |
| 6,618,725 | B1 | * | 9/2003  | Fukuda et al. ......... 707/999.006 |
| 7,433,879 | B1 |   | 10/2008 | Sharma et al. |
| 7,496,592 | B2 | * | 2/2009  | Chi et al. ............... 707/999.102 |
| 7,801,924 | B2 | * | 9/2010  | Thonangi ..................... 707/797 |
| 7,953,685 | B2 | * | 5/2011  | Liu et al. ........................ 706/45 |
| 7,962,526 | B2 | * | 6/2011  | Li et al. ......................... 707/803 |
| 8,126,911 | B2 | * | 2/2012  | Hu et al. ........................ 707/776 |
| 2005/0044094 | A1 | * | 2/2005  | Li et al. ......................... 707/101 |
| 2006/0174024 | A1 | * | 8/2006  | Chi et al. ....................... 709/231 |
| 2007/0244747 | A1 | * | 10/2007 | Nikovski ......................... 705/14 |
| 2008/0201340 | A1 | * | 8/2008  | Thonangi ...................... 707/100 |
| 2009/0171954 | A1 | * | 7/2009  | Liu et al. ............... 707/E17.012 |
| 2009/0193044 | A1 | * | 7/2009  | Buehrer et al. ............... 707/101 |

(Continued)

FOREIGN PATENT DOCUMENTS

EP 1494139 A2 1/2005

(Continued)

OTHER PUBLICATIONS

Yudho Giri Sucahyo and Raj P. Gopalan—"CT-ITL: Efficient Frequent Item Set Mining Using a Compressed Prefix Tree with Pattern Growth"—Australian Computer Society, Inc. The 14th Australasian Database Conference (ADC2003), Adelaide, Australia. Conferences in Research and Practice in Information Technology, vol. 17. X. ACM,2003, (papers:95-104).*

(Continued)

*Primary Examiner* — Jean B Fleurantin
*Assistant Examiner* — Anh Ly
(74) *Attorney, Agent, or Firm* — Steven L. Nichols; VanCott, Bagley, Cornwall & McCarthy P.C.

(57) ABSTRACT

A method, system and computer program product for processing data relating to transactions that enables, for example, performing a Drill-Through on a given association rule for a large number of transactions in a short period of time. A Drill-Through (DT) Preparation, which generates the prefix tree and the transaction group information, and the DT Execution, which determines the transactions supporting an association rule, may be carried out in order to extract hidden information from input data.

25 Claims, 14 Drawing Sheets

U.S. PATENT DOCUMENTS

2011/0060765 A1* 3/2011 Sieb .............................. 707/797

FOREIGN PATENT DOCUMENTS

EP 1494139 A3 8/2006

OTHER PUBLICATIONS

Nicolas Pasquier, Yves Bastide, Rafik Taouil and Lotfi Lakhal—"Efficient Mining of Association Rules Using Closed Itemset Lattices"—PII: s0999479(99)99998-4, Information Systems vol. 24, No. 1.(pp. 25-46) Mar. 1999 Elsevier Science Ltd. (Rearived Jun. 13, 1999; in final retied form Oct. 16, 1999).*

Gopalan et al, TreeITL-Mine: Mining Frequent Itemsets Using Pattern Growth, Tid Intersection and Prefix Tree; Lecture Notes in Computer Science; vol. 2557; Proceedings of the 15th Australian Joint Conference on Artificial Advances in Artificial Intelligence, 2002, pp. 535-546; Publisher: Springer-Verlag, London, UK.

Grahne et al, "Efficiently Using Prefix-trees in Mining Frequent Itemsets"; Concordia University; Montreal, Canada, Dated: Sep. 30, 2010.

Han et al; "Minig Frequent Patterns without Candidate Generation"; School of Computing Science; Simon Fraser University; MOD 2000, Dallas TX.

* cited by examiner

| Transaction ID | Product |
|---|---|
| 1 | Banana |
| 1 | Soap |
| 1 | Fish |
| 1 | Apple |
| 2 | Soap |
| 2 | Orange |
| 2 | Fish |
| 3 | Fish |
| 3 | Soap |
| 3 | Banana |
| 3 | Apple |
| 4 | Soap |
| 4 | Banana |
| 5 | Banana |
| 6 | Bread |
| 7 | Tea |
| 8 | Cake |
| 9 | Banana |
| 9 | Soap |
| 10 | Fish |
| 10 | Apple |
| 10 | Banana |
| 10 | Plums |

*Fig. 1*

| Frequent itemset ID | Product |
|---|---|
| 1 | Fish |
| 1 | Soap |
| 2 | Banana |
| 2 | Fish |
| 2 | Apple |
| . . . | . . . |

*Fig. 2*

| Frequent itemset ID | Transaction ID |
|---|---|
| 1 | 1 |
| 1 | 2 |
| 1 | 3 |
| 2 | 1 |
| 2 | 3 |
| 2 | 10 |
| . . . | . . . |

*Fig. 3*

| Frequent itemset ID | Transaction ID | Product |
|---|---|---|
| 2 | 1 | Banana |
| 2 | 1 | Soap |
| 2 | 1 | Fish |
| 2 | 1 | Apple |
| 2 | 3 | Soap |
| 2 | 3 | Fish |
| 2 | 3 | Apple |
| 2 | 3 | Banana |
| 2 | 10 | Fish |
| 2 | 10 | Apple |
| 2 | 10 | Banana |
| . . . | . . . | . . . |

*Fig. 4*

| Item ID | Sibling ID | Children ID | Transaction Group ID |
|---|---|---|---|
| B | 0 | 1 | G7 |
| S | 0 | 2 | G8 |
| S | 1 | 3 | G3 |
| F | 1 | 4 | G5 |
| F | 2 |   | G6 |
| F | 3 | 5 | G2 |
| A | 4 |   | G4 |
| A | 5 |   | G1 |

Fig. 8

| Parent Transaction Group ID | Child Transaction Group ID |
|---|---|
| G7 | G3 |
| G7 | G5 |
| G3 | G2 |
| G2 | G1 |
| G5 | G4 |
| G8 | G6 |
| . . . | . . . |

Fig. 9

| Transaction Group ID | Transaction ID |
|---|---|
| G1 | 1 |
| G1 | 3 |
| G3 | 9 |
| G7 | 4 |
| G7 | 5 |
| . . . | . . . |

*Fig. 10*

ACCELERATED DRILL-THROUGH ON ASSOCIATION RULES

CROSS-REFERENCE TO RELATED APPLICATIONS

The present application claims priority pursuant to 35 U.S.C. §119(a) from European Patent Application No. 09169735.9, filed on Sep. 8, 2009, which is incorporated herein by reference in its entirety.

BACKGROUND

The present application describes computerized methods for processing data relating to transactions, data processing systems for data relating to transactions, a computer data structure for data relating to transactions, and computer program products for processing data relating to transactions.

Data mining refers in general to data-driven approaches for extracting hidden information from input data. The amount of input data may be huge, and therefore data mining techniques typically consider how to effectively process large amounts of data. Consider manufacturing of products as an example. There, the input data may include various pieces of data relating to origin and features of components. The aim of data mining in the context of manufacturing may be to resolve problems relating to quality analysis and quality assurance. Data mining may be used, for example, for root cause analysis, for early warning systems within the manufacture plant, and for reducing warranty claims. As a second example, consider various information technology systems. There, data mining may further be used for intrusion detection, system monitoring, and problem analyses. Data mining has also various other uses, for example, in retail and services, where typical customer behavior can be analyzed, and in medicine and life sciences for finding causal relations in clinical studies.

BRIEF SUMMARY

A method for processing data relating to transactions, comprises, with a processor, generating a computer data structure representing a prefix tree based on transaction information describing a number of transactions, each transaction comprising a respective set of items, nodes of the prefix tree representing respective items, and branches of the prefix tree representing respective frequent itemsets occurring in the transactions, the generation resulting in prefix tree information, assigning a transaction group identifier for each prefix tree node representing an item, associating the transaction group identifier of each leaf node with identifiers of transactions comprising items represented by nodes of a prefix tree branch ending at the leaf node, associating the transaction group identifier of each non-leaf node with transaction group identifiers of direct child nodes of the non-leaf node and with identifiers of transactions, comprising items represented by nodes of a prefix tree branch ending at the non-leaf node, the associations resulting in transaction group information describing associations between the transaction group identifiers and the identifiers of the transactions, and storing, in a memory, the prefix tree information, information about assigning the transaction group identifiers to the prefix tree nodes, and the transaction group information.

Further, a method for processing data relating to transactions comprises, with a processor, receiving prefix tree information, transaction group identifier assignment information, and transaction group information, in which the prefix tree information represents a prefix tree, nodes of the prefix tree representing respective items in the transactions, and branches of the prefix tree representing respective frequent itemsets occurring in the transactions, the transaction group identifier assignment information indicates a transaction group identifier assigned for each prefix tree node representing an item, the transaction group information provides associations of the transaction group identifier of each leaf node with identifiers of transactions comprising items represented by nodes of a prefix tree branch ending at the leaf node and provides associations of the transaction group identifier of each non-leaf node with transaction group identifiers of direct child nodes of the non-leaf node and with identifiers of transactions, comprising items represented by nodes of a prefix tree branch ending at the non-leaf node, sorting a set of items of an association rule in accordance with an order used for the prefix tree resulting in a sorted set of items, determining an end node of a branch of the prefix tree representing a frequent itemset corresponding to the sorted set of items, and determining which transactions support the association rule by determining which transaction identifiers are associated with the transaction group identifier of the end node based on the transaction group information.

A system for processing data relating to transactions, comprises an input device for providing transaction information describing the transactions, each transaction comprising a respective set of items, and a processor communicatively coupled to the input device that: generates a computer data structure representing a prefix tree based on the transaction information, nodes of the prefix tree representing respective items, and branches of the prefix tree representing respective frequent itemsets occurring in the transactions, the generation resulting in prefix tree information, assigns a transaction group identifier for each prefix tree node representing an item, and associates the transaction group identifier of each leaf node with identifiers of transactions comprising items represented by nodes of a prefix tree branch ending at the leaf node, for associating the transaction group identifier of each non-leaf node with transaction group identifiers of direct child nodes of the non-leaf node and with identifiers of transactions, comprising items represented by respective nodes of a prefix tree branch ending at the non-leaf node, the associations resulting in transaction group information describing associations between the transaction group identifiers and the identifiers of the transactions.

A computer program product for processing data relating to transactions, comprises a computer readable storage medium having computer usable program code embodied therewith, in which the computer usable program code: generates a computer data structure representing a prefix tree based on transaction information describing a number of transactions, each transaction comprising a respective set of items, nodes of the prefix tree representing respective items, and branches of the prefix tree representing respective frequent itemsets occurring in the transactions, the generation resulting in prefix tree information, assigns a transaction group identifier for each prefix tree node representing an item, associates the transaction group identifier of each leaf node with identifiers of transactions comprising items represented by nodes of a prefix tree branch ending at the leaf node, and associates the transaction group identifier of each non-leaf node with transaction group identifiers of direct child nodes of the non-leaf node and with identifiers of transactions, comprising items represented by nodes of a prefix tree branch ending at the non-leaf node, the associations resulting in transaction group information describing associations between the transaction group identifiers and the identifiers of the transactions.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

FIG. 1 is an illustrative transaction table with product items, according to one exemplary embodiment of principles described herein.

FIG. 2 is an illustrative frequent itemset table, according to one exemplary embodiment of principles described herein.

FIG. 3 is an illustrative table with frequent itemsets and transactions, according to one exemplary embodiment of principles described herein.

FIG. 4 is an illustrative table with results of a Drill-Through, according to one exemplary embodiment of principles described herein.

FIG. 8 is an illustrative prefix tree table, according to one exemplary embodiment of principles described herein.

FIG. 9 is an illustrative first transaction group table, according to one exemplary embodiment of principles described herein.

FIG. 10 is an illustrative second transaction group table, according to one exemplary embodiment of principles described herein.

Throughout the drawings, identical reference numbers designate similar, but not necessarily identical, elements.

DETAILED DESCRIPTION

Figure 5:
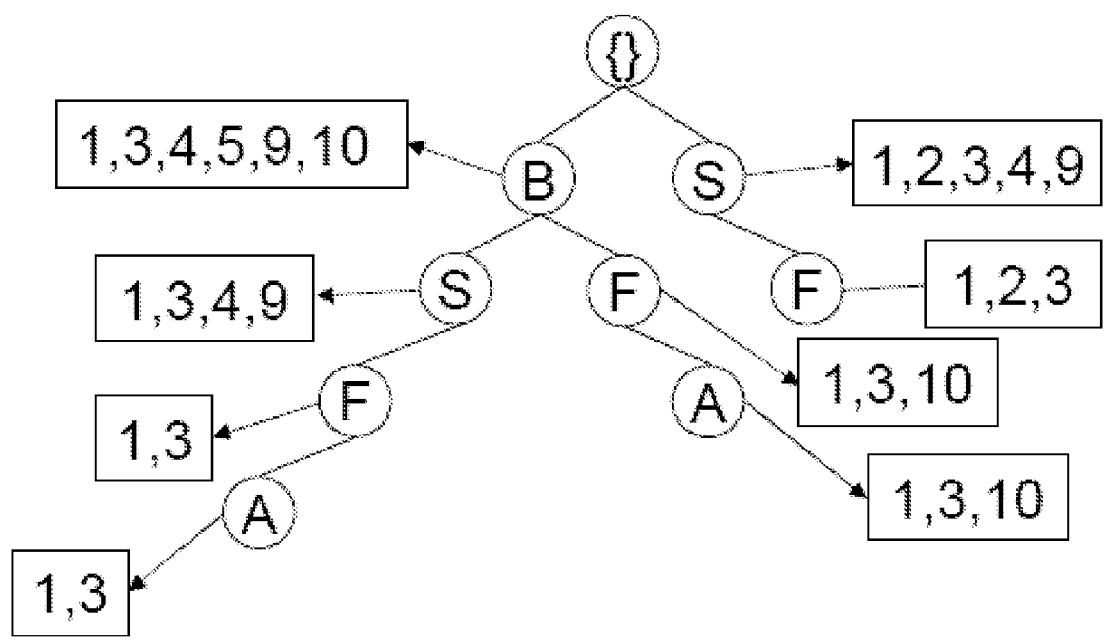
FIG. 5 is an illustrative prefix tree with transaction identifiers, according to one exemplary embodiment of principles described herein.

The present specification discloses method, system and computer program product for processing data relating to transactions that enables, for example, performing a Drill-Through on a given association rule for a large number of transactions in a short period of time. A Drill-Through (DT) Preparation, which generates the prefix tree and the transaction group information, and the DT Execution, which determines the transactions supporting an association rule, may be carried out to extract hidden information from input data.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Pattern detection is a data mining discipline, where the input data consist of sets of transactions and where each transaction consists of a set of items. A transaction can represent, e.g., a production history of a device, where the items represent parts of the device and manufacturing processes. A second example of a transaction may be items bought together by a customer. In principle, a transaction can be any event or process that has a group of items belonging together.

Association rules are patterns describing which items occur frequently within transactions. Consider a set of items $I=\{I_1, I_2, \ldots I_m\}$. Let D be a set of transactions, where each transaction T is a subset of items belonging to I. A transaction T may contain a subset $A=\{I_1, I_2, \ldots I_p\}$ of items in I and may also contain a further subset $B=\{I_{p+1}, I_{p+2}, \ldots I_q\}$ of items in I, where the subset A and the subset B are disjunct; that is, have no common elements. An association rule is an implication of the form $A \rightarrow B$, that is $\{I_1, I_2, \ldots I_p\} \rightarrow \{I_{p+1}, I_{p+2}, \ldots I_q\}$, between the subset A and the subset B. The subset A of items is called the body and the subset B of items the head of the rule. The association rule $A \rightarrow B$ holds true in the transaction set D with a confidence c, if c % of the transactions in D that contain the subset A of items also contain the subset B of items. In other words, the confidence or the support c is the conditional probability of finding the union set S of items of the subset A and the subset B occurring in a transaction T in the transaction set D. The aim in data mining is in general to accurately find all association rules meeting user defined criteria. The user may define a minimum support or confidence for the rules, as very rare or loosely correlated events may not be of importance for some applications. These union sets S of items with high support are called frequent itemsets when they appear in at least a pre-defined fraction of the transactions.

Association Rule Mining (ARM) can discover association rules with strong relationships between the items in these transactions. Analysts often want to directly analyze the transactions in which a certain rule occurs. The procedure to retrieve these underlying transactions of a certain rule is called "Drill-Through" (DT). DT enables analysts to evaluate a certain association rule in the context of the original data. The challenge is to find the appropriate transactions for a dedicated rule among a huge amount of transactions in a reasonable amount of time as the analysis is performed in real time.

For in-memory based software solutions, the transactions are simply stored as references attached to the association rules. Some solutions also use sample data that is stored together with the association rules. This solution can also be applied for data not fitting into main memory. When a Drill-Through is performed, just a sample set of transactions can be returned to the user. However, in many cases, this sample set is not sufficient for the analysis.

There also exist heuristic techniques, which try to find most of the transactions relating to a given association rule in the database. Similar to the sampling solution, the heuristic approaches are not sufficient as they do not ensure retrieval of all relevant transactions. In the case that transactions and association rules are stored in a database, simple database queries can be performed to retrieve the transactions for given association rules. However, the amount of time needed grows heavily with the number of transactions and association rules stored in the database. Regarding data structures used for storing transactional data, tree structures may be used for this purpose.

When a complete set of transactions supporting the association rule is needed in response to a Drill-Through request, the amount of transactions and items is typically very large. Hence, there is a problem in performing data mining operations in a reasonable time.

Therefore, the present application provides a computerized method for processing data relating to transactions that enables, for example, performing a Drill-Through on a given association rule for a large number of transactions in a short period of time.

In the following, examples are discussed using a market basket of a customer buying a set of items as an example of a transaction. It is clear, however, that the items and transactions could as well relate, for example, to scientific or technical data. It is irrelevant for the present application what the transactions and items are.

FIG. 1 illustrates a transaction table with associated items. Each of the market baskets has a corresponding transaction identifier and comprises one or more items. The transaction table has for each transaction identifier (ID) a set of entries and each entry specifies an item. For example, the market basket with transaction identifier "1" contains the following items: "Banana," "Soap," "Fish," and "Apple."

Association Rule Mining pre-determines association rules based on transaction information. For example, the association rule "Fish=>Soap" states that a customer who bought "Fish" also frequently bought "Soap." FIG. 2 shows a table of frequent itemsets. A frequent itemset is a set of items, for example, {Fish, Soap} and {Banana, Fish, Apple}, which occurs in at least a pre-defined fraction of the transactions and supports the given association rule. The frequent itemsets have corresponding identifiers, for example, "1" and "2." The table has for each frequent itemset identifier a set of entries, and each entry specifies an item. Frequent itemsets can be subsets of other frequent itemsets.

FIG. 3 shows a table with associations between transactions and frequent itemsets. A frequent itemset can occur in multiple transactions, and a transaction can contain multiple frequent itemsets, which can be subsets of one another. For example, the frequent itemset "2" occurs in the transactions {1, 3, 10}. The transaction "1" is also associated with the frequent itemset "1." Since many combinations of frequent itemsets and transactions are possible, this association table of FIG. 3 can become very large and can have even more entries than the original transaction table of FIG. 1.

To perform a Drill-Through and retrieve transactions that support a given rule, for example, "Banana, Fish→Apple," a frequent itemset identifier, for example, "2," is determined from the frequent itemset table of FIG. 2. A database query on the two tables shown in FIG. 1 and FIG. 3 can be performed for the given frequent itemset. An SQL query joins entries of both tables, where corresponding entries have same transaction identifiers. FIG. 4 shows a result table of the join operation. Entries of this result table specify the frequent itemset, the supporting transactions, and the items occurring in the corresponding transactions. Even though the frequent itemset "2" does not include the item "Soap," the result set comprises the product "Soap" because it occurs in the transactions "1" and "3."

The present example embodiments utilize a prefix tree. A prefix tree is an ordered tree data structure that is used to store an associative array with keys and data values, where the keys can be separated into parts. A prefix tree node, except for the root node, is not associated with its full key; only with a part of its key. The position of the node in the tree, however, shows the full key the node is associated with. This means that the key of the node has a prefix composed of key parts that are associated with respective nodes of a branch ascending from the specific node, which explains the name "prefix tree." Not all the nodes of the prefix tree need to be associated with data values.

The prefix tree according to an example, stores information about frequent itemsets and associated transactions in an aggregated manner. The prefix tree has nodes, and each node represents a respective item. A prefix tree branch is defined by a sequence of nodes, where a parent node precedes one of its child nodes. A branch of the prefix tree represents a frequent itemset, and nodes of the branch represent items of the frequent itemset.

Figure 6:
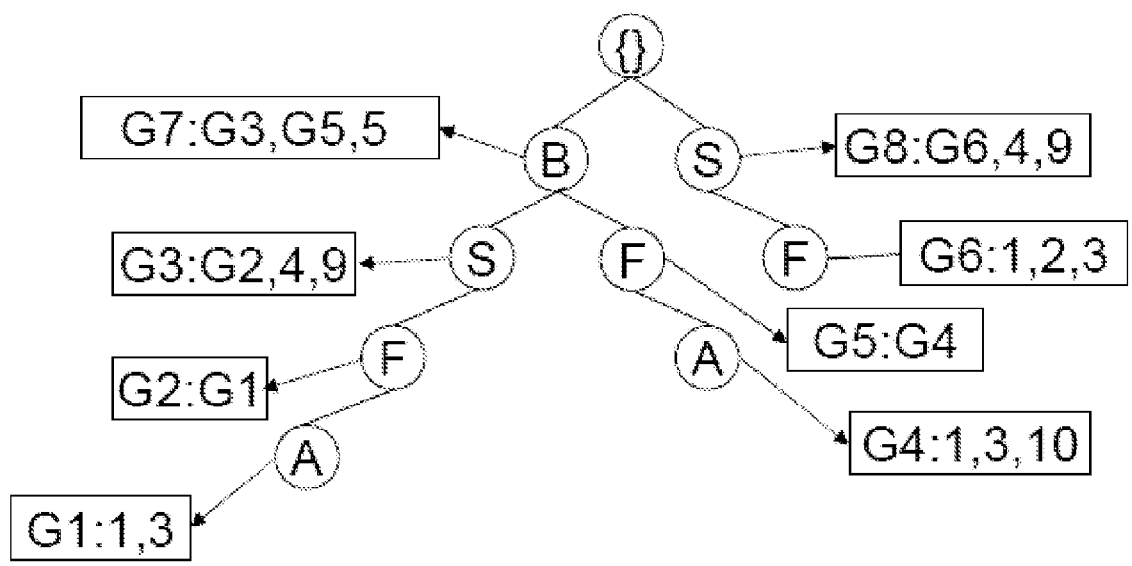
FIG. 6 is an illustrative prefix tree with transaction group identifiers, according to one exemplary embodiment of principles described herein.
Figure 7:
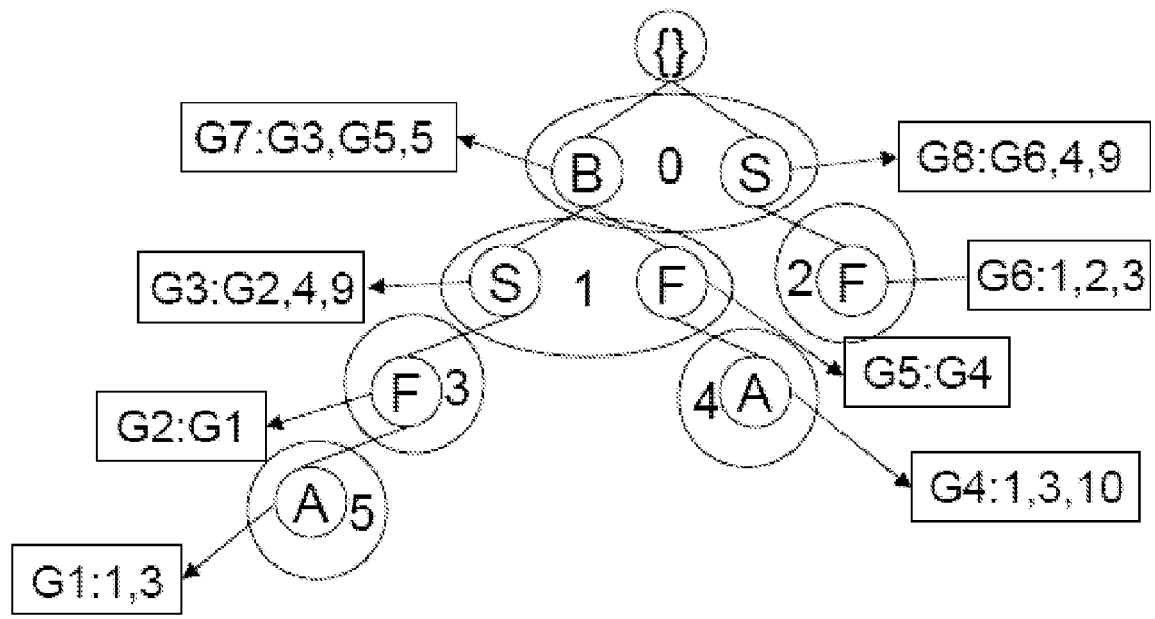
FIG. 7 is an illustrative prefix tree with transaction group identifiers and sibling identifiers, according to one exemplary embodiment of principles described herein.

FIG. 5 shows such a prefix tree with associated transactions. The prefix tree comprises four different items, "B"="Banana," "S"="Soap," "F"="Fish," and "A"="Apple," which occur most frequently in transactions in FIG. 1. In FIG. 5 to FIG. 7 and in the remainder of the description, product names are abbreviated with their first letters. When product items occur less frequently in the transactions, for example, the items "Orange," "Plums," "Bread," "Tea," and "Cake," they are not considered for the frequent itemsets. For the four most frequent items {B, S, F, A} a sort order is pre-defined. This order can be in accordance with frequencies of the products, with their alphabetical order or with any other order. In an exemplary embodiment, the items are sorted according to their occurrence frequencies, that is, [B, S, F, A], where "B" is the most frequent item and "A" the least frequent item. The prefix tree is built so that all frequent itemsets occurring in transactions are in the prefix tree, for example, {B, S, A}, {B, F, A}, and {S, F}. The frequent itemsets {B, S, F, A} and {B, F, A} have their first items "B" in common. Therefore, the respective branches, the leftmost and the center branch of the prefix tree, share their top-level nodes. The frequent itemset {S, F} does not have same first items as other frequent itemsets and is represented by the rightmost branch which does not share any of its nodes with other branches. The prefix tree further comprises subsets of the frequent itemsets represented by sub-branches descending from the top of the prefix tree. For example, the branch {B, S, F, A} has the sub-branches {B, S, F}, {B, S}, and {B}, which represent respective frequent itemsets. Thus, the prefix tree has a minimum number of the nodes by sharing the nodes to a maximum extent. Sharing common nodes provides data compression of the frequent itemset and item information, in particular, when the items are sorted according to their frequency.

To enable access to transactions that support a given frequent itemset, each of the prefix tree nodes is associated with a respective set of transaction identifiers (IDs). A transaction associated with a specific node comprises items represented by nodes of a branch of the prefix tree ending at the specific node. For example, transaction "4" has the items "B" and "S" and is only associated with the nodes "B" and "S" of the leftmost branch {B, S, F, A}. This transaction "4" is not associated with the node "F" of the same branch because the item "F" is not included in the transaction. If a transaction identifier is associated with a node, the transaction contains items represented by all parent nodes of this node in the prefix tree.

To compact the transaction information associated with the tree nodes, a transaction group identifier is assigned for each of the nodes. FIG. 6 shows how eight transaction group identifiers {G1, G2, . . . , G8} are associated with the respective nodes. A transaction group identifier of a leaf node, for example, the identifier "G1" for node "A" of the leftmost branch, is associated with a set of transactions {1, 3}. These transactions have items {A, F, S, B} represented by nodes of the leftmost branch ending at the node "A." A transaction group identifier of a non-leaf node, for example, the identifier "G7" for node "B" of the leftmost and center branches, is associated with transaction group identifiers {G3, G5} of its direct child nodes {S, F} and is associated with a set of transactions, here with only one transaction {5}. This transaction "5" has only one item {B} represented by the node "B." The transaction group identifier "G2" of the non-leaf node "F" of the leftmost branch only has an association with the transaction group identifier "G1" assigned to its child node "A."

Items can occur in the prefix tree several times; for example, the node "F" is a member of three branches. Therefore, an item identifier or product label is not enough to uniquely determine an item location in the prefix tree. To solve this problem, a unique sibling identifier may be assigned for each set of direct child nodes of a common parent node as shown in FIG. 7. For example, the nodes "S" and "F" of the leftmost and center branches are direct child nodes of the parent node "B" and have a sibling identifier "1." When a parent node has only one child node, for example, the nodes "F" and "A" in the leftmost branch, the sibling set for the child node "A" with sibling identifier "5" has only one member. The top-level sibling nodes, that is, the child nodes of the root node, "B" and "S," get the sibling identifier "0."

Prefix tree information may be stored in a prefix tree table that has one entry for each tree node as shown in FIG. 8. An entry of the prefix tree contains an item identifier (ID), a sibling identifier, a transaction group identifier, and a sibling identifier of direct child nodes if any exist. Each entry is uniquely identified by the item identifier and the sibling identifier and specifies a transaction group identifier assigned to the tree node. When a tree node has child nodes, that is, the tree node is a non-leaf node, the corresponding entry of the prefix tree table comprises a sibling identifier of these child nodes. This identifier is denoted as a children identifier for the tree node. For example, the first entry of the prefix tree table with item identifier "B" and sibling identifier "0" has the children identifier "1." When the tree node is a leaf node, the children identifier of the corresponding entry is not specified. For example, the last entry of the prefix tree table with item identifier "A" and sibling identifier "5" has no children identifier. The prefix tree table of FIG. 8 contains all entries for the prefix tree as shown in FIG. 6 and FIG. 7.

Database indexes are additional data structures that improve the speed of operations on a database table. The database indexes can be created using one or more columns of the table, providing the basis for a quick location of the entries of the database table from which the required data is read. For the prefix tree table, a first database index can be defined for the sibling identifier column. A second database index on the item identifier column is optional and depends on the number of different items.

Transaction group information may be stored in a first and second transaction group table as depicted in FIG. 9 and FIG. 10. The first transaction group table represents the recursive transaction group relations and has for each transaction group identifier (ID) assigned to a parent node, a respective set of entries, each entry specifying a transaction group identifier (ID) assigned to a direct child node of the parent node. FIG. 9 shows the first transaction group table. The first and second entries refer to a parent transaction group identifier "G7," which is assigned to the parent node "B." This parent transaction group identifier is associated with two child transaction group identifiers, "G3" and "G5," which are assigned to respective child nodes "S" and "F" of the parent node "B." The second transaction group table associates transaction groups and transactions. It has for each transaction group identifier a respective set of entries, each of the entries specifying a transaction identifier (ID) associated with the transaction group identifier (ID). FIG. 10 depicts the second transaction group table with two entries for transaction group identifier "G1." This transaction group contains the transaction identifiers "1" and "3."

To accelerate locating entries of the first transaction group table, a database index on the column of the parent transaction group identifier can be useful. For the second transaction group table, a database index can be defined on the transaction group identifier column.

According to embodiments of the present invention, a data mining system may perform a Drill-Through (DT) operation, which retrieves transactions and items that support a given association rule. This retrieval process is based on information stored in the prefix table and in the transaction group tables and comprises at least the first three of the following steps:
1) The data mining system sorts items of an association rule according to a pre-determined order that has been used to construct the prefix tree.
2) A branch of prefix tree nodes representing the sorted set of items is determined by descending the prefix tree node by node, from a top-level node to an end node of the branch.
3) Sets of transaction identifiers are determined based on transaction group identifiers assigned to the nodes of the branch. The determined sets of transaction identifiers are merged into a resulting superset, where duplicate transaction identifiers are ignored.
4) For each of the transactions that are associated with a transaction group assigned to a specific node, a respective set of items can be determined. The determined items are represented by the specific node and all parent nodes of the specific node.

To determine the end node of the prefix tree branch according to step 2), prefix tree information stored in the prefix tree table is recursively resolved. A first recursive process starts at an entry of the prefix tree table identified by the first item identifier of the sorted set of items and further identified by the sibling identifier "0." This first process searches a subsequent entry from the prefix tree table that is identified by a subsequent item identifier of the sorted set of items and by a sibling identifier, where the sibling identifier corresponds to a children identifier of a preceding entry. The first process stops in one of three cases:
  a) when an entry of the prefix tree table does not have any children identifier, that is, the entry represents a leaf node of the prefix tree;
  b) when the sorted set of items has no more items corresponding to the entries of the prefix tree table; and
  c) when the prefix tree table has no more entries corresponding to the sorted set of items.

Only when the last determined entry of the prefix table corresponds to the last item of the sorted set of items, the branch represents the frequent itemset. Then, this last determined entry represents the end node of the branch. The first process finally determines the transaction group identifier based on the last entry.

To determine transaction identifiers according to step 3), a second recursive process may determine further transaction group identifiers based on the end node transaction group identifier when the end node is a non-leaf node and a third process may determine the transaction identifiers.

The second process is based on entries of the first transaction group table. The second process descends all sub-branches of the prefix tree starting from the determined end node and ending at leaf nodes. The second process determines for each parent transaction group identifier a respective set of entries. Each of the entries specifies a respective child transaction group identifier, which is used as a parent transaction group identifier for a succeeding step of the second recursive process. The second recursive process ends when no more entries are found; that is, when the leaf nodes of the prefix tree are reached.

For each of the resolved transaction group identifiers, the third process retrieves a respective set of transaction identifiers from the second transaction group table. The retrieved transaction identifiers are appended to a superset of transaction identifiers, where duplicates are ignored. A set-based data structure may be used for this operation. The resulting superset defines all transactions that support the given association rule. The second and third process may run sequentially, in parallel, or may be integrated into one process.

To determine item identifiers associated with the transactions according to step 4), a forth process may determine based on the transaction table as shown in FIG. 1 for each of the transaction identifiers a respective set of item identifiers. This fourth process may also be integrated into the third process.

Figure 11:
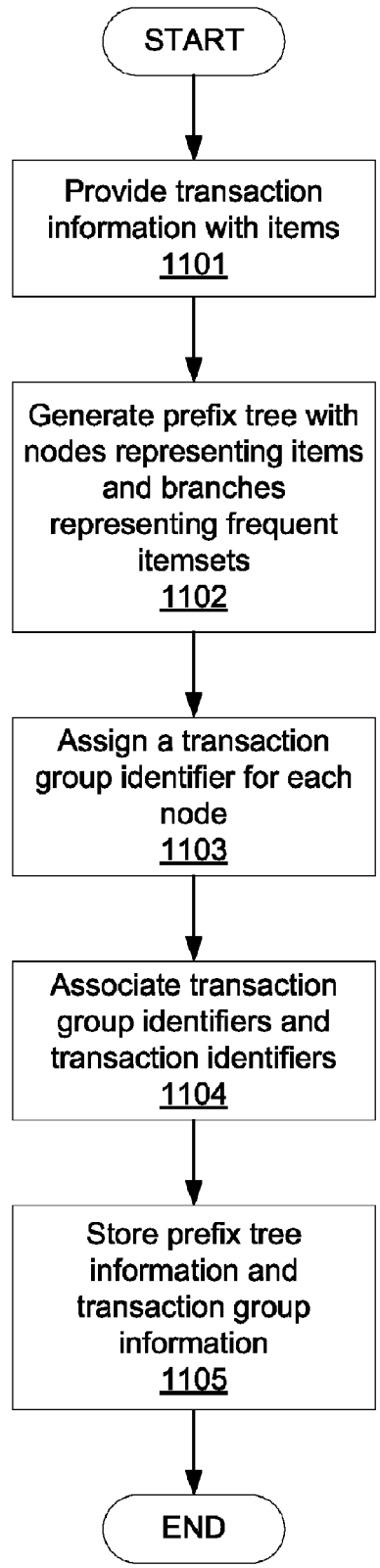
FIG. 11 is a flow chart showing an illustrative Drill-Through Preparation method, according to one exemplary embodiment of principles described herein.

FIG. 11 illustrates a flow chart of a Drill-Through Preparation that may be carried out by a data processing system according to an embodiment of the invention. The data processing system provides, in step 1101, transaction information describing transactions with items and frequent itemsets occurring in the transactions. Prefix tree information is generated in step 1102. Nodes of the prefix tree represent the items and branches represent frequent itemsets. A transaction group identifier is assigned in step 1103 for each of the nodes. Transaction group identifiers and transaction identifiers are associated with each other in step 1104, and this association results in transaction group information. The prefix tree information, information about assigning the transaction group identifiers to the prefix tree nodes, and the transaction group information is stored in step 1105.

Figure 12:
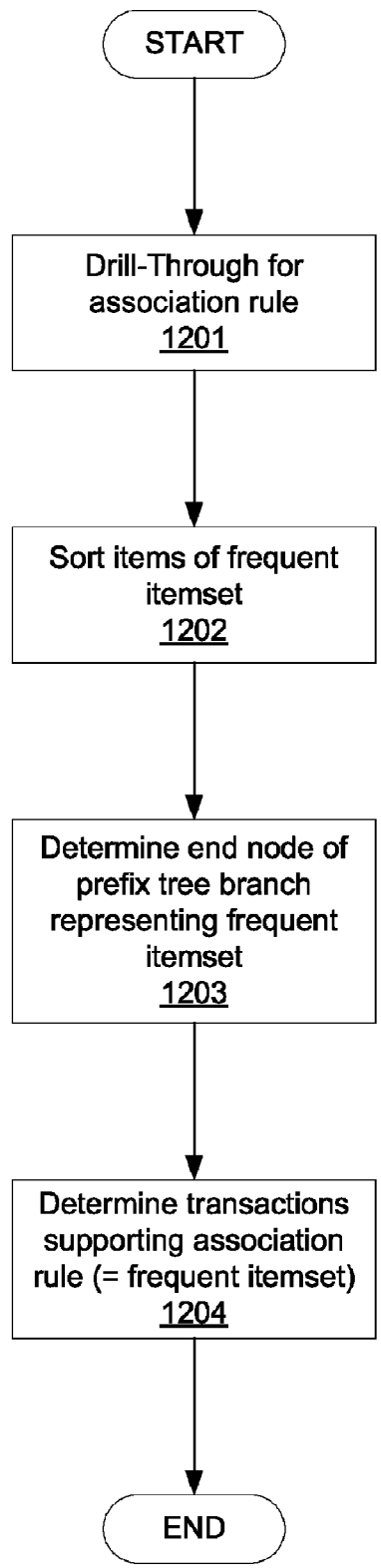
FIG. 12 is a flow chart showing a Drill-Through Execution method, according to one exemplary embodiment of principles described herein.

FIG. 12 illustrates a flow chart describing a Drill-Through Execution for a given association rule corresponding to a frequent itemset. This method is also carried out by a data processing system according to an embodiment of the invention. In step 1201, a request for a Drill-Through is received for an association rule that has a set of items. The set of items is sorted in step 1202 in accordance with an order used for the prefix tree. An end node of a prefix tree branch representing the frequent itemset is determined in step 1203 based on the prefix tree information. Transactions supporting the association rule are determined in step 1204 based on the transaction group information.

Figure 13:
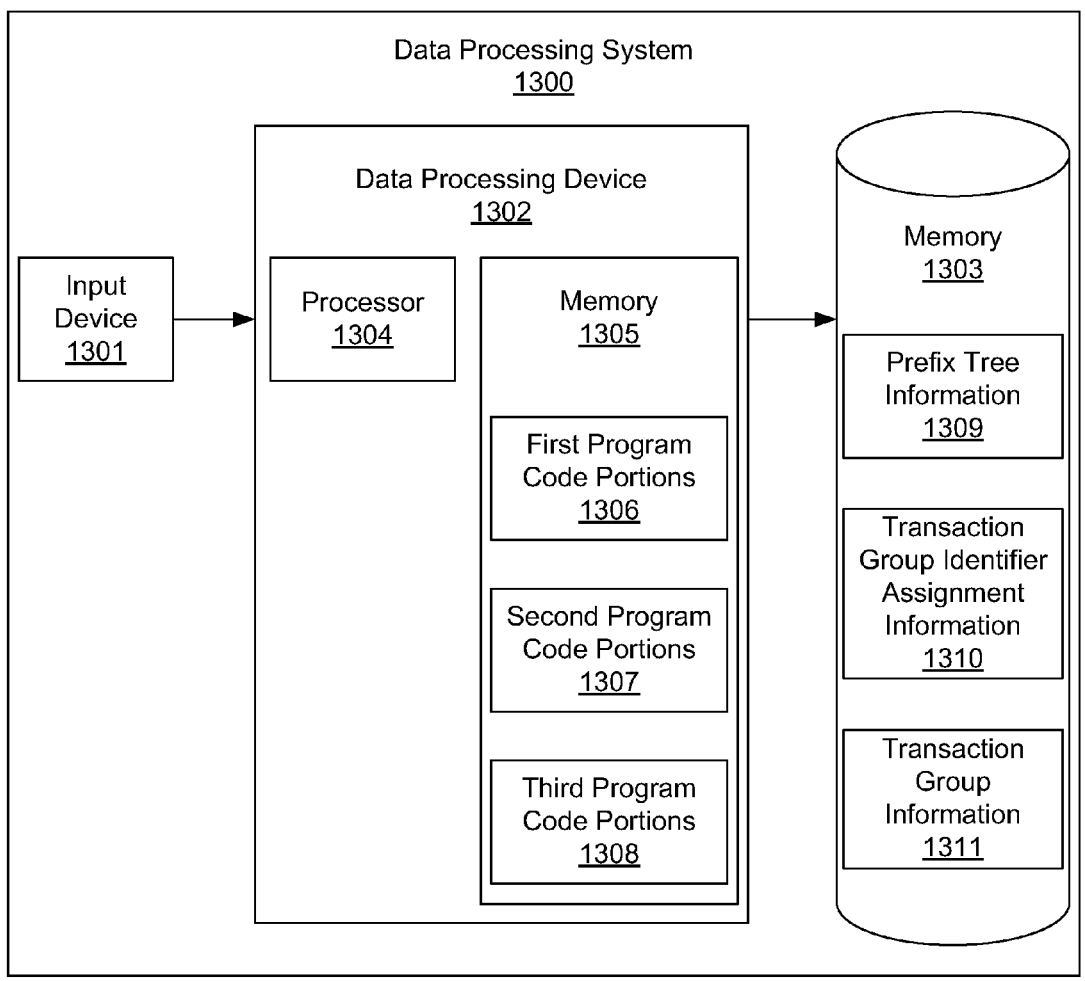
FIG. 13 is a block diagram of an illustrative data processing system for a Drill-Through Preparation, according to one exemplary embodiment of principles described herein.

FIG. 13 illustrates a block diagram of a data processing system 1300 for a Drill-Through Preparation. The data processing system comprises an input device 1301, a data processing system 1302, and a memory 1303. The input device provides transaction information describing the transactions, which have items, and may include, for example, input devices such as a keyboard, a mouse, a sensor, a separate computer processing device, or a network device communicatively coupled to the data processing system 1302. The transaction information may be stored in the same data processing system or come from a different data processing system. The data processing system may comprise a processor 1304 and a memory 1305. The processor stores program code portions, 1306, 1307, 1308, in respective elements of the memory 1305 and executes these program code portions as follows: According to first program code portions 1306, the processor generates a computer data structure representing a prefix tree based on the transaction information provided by the input device. Nodes of the prefix tree represent respective items. Branches of the prefix tree represent respective frequent itemsets occurring in the transactions. The generation of the computer data structure results in prefix tree information 1309. According to second program code portions 1307, the processor assigns a transaction group identifier 1310 for each prefix tree node representing an item. According to third program code portions 1308, the processor associates the transaction group identifier of each leaf node with identifiers of transactions having items represented by nodes of a prefix tree branch ending at the leaf node. The processor associates the transaction group identifier of each non-leaf node with transaction group identifiers of direct child nodes of the non-leaf node and with identifiers of transactions that have items represented by respective nodes of a prefix tree branch ending at the non-leaf node if any such transactions exist. These associations result in transaction group information 1311 describing associations between the transaction group identifiers and the identifiers of the transactions.

The memory 1303 stores the prefix tree information 1309, the transaction group identifier assignment information 1310 indicating the transaction group identifiers assigned for nodes of the prefix tree, and the transaction group information 1311, and may include, for example, an electronic, magnetic, optical, electromagnetic, infrared, or semiconductor system, apparatus, or device, or any suitable combination of the foregoing. More specific examples (a non-exhaustive list) of the memory 1303 may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. The data processing system may comprise further memory elements to store temporary data.

Figure 14:
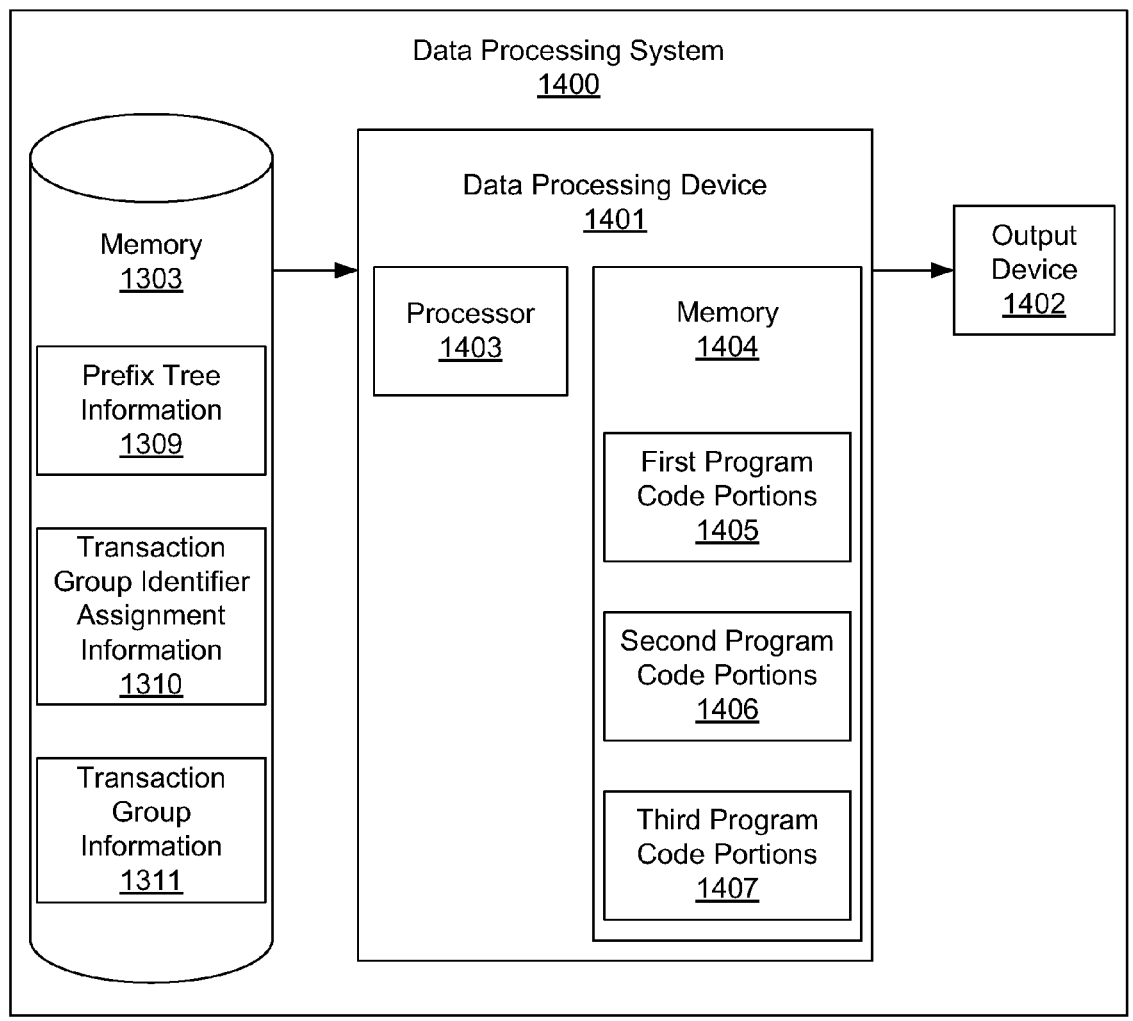
FIG. 14 is a block diagram of an illustrative data processing system for a Drill-Through Execution, according to one exemplary embodiment of principles described herein.

FIG. 14 illustrates a block diagram of a data processing system 1400 for a Drill-Through Execution. The data processing system comprises an input device 1303, a data processing system 1401, and an output device 1402. The input device receives prefix tree information 1309, transaction group identifier assignment information 1310, and transaction group information 1311. In one exemplary embodiment, the input device is the memory 1303 of FIG. 13. Alternatively, the input device may be a network device for receiving the information over a network or by any other means for receiving information. The data processing system may comprise a processor 1403 and a memory 1404. The processor stores program code portions, 1405, 1406, 1407, in respective elements of the memory 1404 and executes these program code portions as follows: According to first program code portions 1405, the processor sorts a set of items of an association rule in accordance with an order used for the prefix tree resulting in a sorted set of items. According to second program code portions 1406, the processor determines an end node of a branch of the prefix tree, where the branch represents a frequent itemset corresponding to the sorted set of items. According to third program code portions 1407, the processor determines which transactions support the association rule by determining, based on the transaction group information, which transaction identifiers are associated with the transaction group identifier of the end node. The output device 1402 provides information indicating the transactions that support the association rule, and may include, for example, a monitor, a number of speakers, and a projector. The data processing system may comprise further memory elements to store temporary data.

The Drill-Through (DT) Preparation, which generates the prefix tree and the transaction group information, and the DT Execution, which determines the transactions supporting an association rule, may be carried out in the same data processing system. Alternatively, both the DT Preparation and DT Execution may be performed, e.g., in different data processing systems, which requires a transfer of the generated information, for example, by transmission over a network.

Embodiments of the present invention are not restricted to the market-basket problem, but are also possible in other application areas. In the healthcare sector, data relating to a medical patient are analyzed. The medical patient corresponds to a transaction of an exemplary embodiment. In this case, the items typically represent value ranges of diagnostic data, for example, "(Blood pressure>240)," "(Heart rate>140)," etc. For a specific diagnostic rule or symptom pattern, for example, "{(Blood pressure>240), (Heart rate>140)}→(Cholesterol>290)," the present invention allows a Drill-Through to retrieve from a database all medical patients supporting this rule in a relatively short time.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. While the foregoing has been with reference to particular embodiments of the invention, it will be appreciated by those skilled in the art that changes in these embodiments may be made without departing from the principles and spirit of the invention, the scope of which is defined by the appended claims.

Having thus described the invention of the present application in detail and by reference to embodiments thereof, it will be apparent that modifications and variations are possible without departing from the scope of the invention defined in the appended claims.

What is claimed is:

1. A method for processing data relating to transactions comprising:
   with a processor:
   generating a computer data structure representing a prefix tree based on transaction information describing a number of transactions, each transaction comprising a respective set of items, nodes of the prefix tree representing respective items, and branches of the prefix tree representing respective frequent itemsets occurring in the transactions, the generation resulting in prefix tree information, assigning a transaction group identifier for each prefix tree node representing an item;
   associating the transaction group identifier of each leaf node with identifiers of transactions comprising items represented by nodes of a prefix tree branch ending at the leaf node,
   associating the transaction group identifier of each non-leaf node with transaction group identifiers of direct child nodes of the non-leaf node and with identifiers of transactions, comprising items represented by nodes of a prefix tree branch ending at the non-leaf node, the associations resulting in transaction group information describing associations between the transaction group identifiers and the identifiers of the transactions, and
   storing, in a memory, the prefix tree information, information about assigning the transaction group identifiers to the prefix tree nodes, and the transaction group information.

2. The method of claim 1, further comprising:
   with the processor:
   sorting a set of items of an association rule in accordance with an order used for the prefix tree resulting in a sorted set of items,
   determining an end node of a branch of the prefix tree representing a frequent itemset corresponding to the sorted set of items, and
   determining which transactions support the association rule by determining which transaction identifiers are associated with the transaction group identifier of the end node based on the transaction group information.

3. The method of claim 2, further comprising:
   with the processor:
   assigning direct child nodes of each parent node of the prefix tree to a respective sibling set,
   assigning a sibling identifier for each sibling set, and
   storing, in a storage medium, for each node an item represented by the node, a sibling identifier assigned to the node, a sibling identifier assigned to direct child nodes of the node, and a transaction group identifier assigned to the node.

4. The method of claim 3, in which the prefix tree information is stored in a prefix tree table, the prefix tree table comprising entries, each of the entries being identified by a respective item identifier of the item represented by the node and by a respective sibling identifier assigned to the node and further specifying a respective sibling identifier assigned to direct child nodes of the node, and a respective transaction group identifier assigned to the node.

5. The method of claim 3, in which storing for each node the following information: an item represented by said node, a sibling identifier assigned to said node, a sibling identifier assigned to direct child nodes of said node, and a transaction group identifier assigned to said node is performed if said node has a direct child node.

6. The method of claim 4, further comprising, with the processor, recursively resolving the branch corresponding to the sorted set of items based on the prefix tree table.

7. The method of claim 4, in which specifying a respective sibling identifier assigned to direct child nodes of said node is performed if said node has a direct child node.

8. The method of claim 6, in which the transaction group information is stored in a first transaction group table and a second transaction group table, the first transaction group table comprising information about associations between transaction group identifiers of parent nodes and child nodes, and the second transaction group table comprising information about associations between transaction group identifiers and transaction identifiers.

9. The method of claim 8, further comprising:
   with the processor:
   recursively resolving transaction group identifiers assigned to respective nodes of the branch based on the first transaction group table,
   resolving respective sets of transaction identifiers based on the second transaction group table, and
   joining the resolved sets of transaction identifiers.

10. The method of claim 9, further comprising:
    with the processor:
    sorting the items of the frequent itemsets in accordance with item occurrence frequencies in the transactions, and
    representing higher frequency items by nodes of the prefix tree comprising a higher level than nodes representing lower frequency items.

11. The method of claim 10, in which the prefix tree has a minimum number of the nodes by sharing the nodes to a maximum extent.

12. The method of claim 1, in which associating said transaction group identifier of each non-leaf node with transaction group identifiers of direct child nodes of said non-leaf node and with identifiers of transactions is performed if said non-leaf node has a direct child node.

13. A method for processing data relating to transactions comprising:
    with a processor:
    receiving prefix tree information, transaction group identifier assignment information, and transaction group information, in which
    the prefix tree information represents a prefix tree, nodes of the prefix tree representing respective items in the transactions, and branches of the prefix tree representing respective frequent itemsets occurring in the transactions,
    the transaction group identifier assignment information indicates a transaction group identifier assigned for each prefix tree node representing an item,
    the transaction group information provides associations of the transaction group identifier of each leaf node with identifiers of transactions comprising items represented by nodes of a prefix tree branch ending at the leaf node and provides associations of the transaction group identifier of each non-leaf node with transaction group identifiers of direct child nodes of the non-leaf node and with identifiers of transactions, comprising items represented by nodes of a prefix tree branch ending at the non-leaf node,
    sorting a set of items of an association rule in accordance with an order used for the prefix tree resulting in a sorted set of items, determining an end node of a branch of the prefix tree representing a frequent itemset corresponding to the sorted set of items, and determining which transactions support the association rule by determining which transaction identifiers are associated with the transaction group identifier of the end node based on the transaction group information.

14. The method of claim 13, further comprising outputting, with an output device, information indicating the transactions supporting the association rule.

15. The method of claim 13, in which the transaction group information provides associations of the transaction group identifier of each non-leaf node with transaction group identifiers of direct child nodes of the non-leaf node and with identifiers of transactions if said non-leaf node has a direct child node.

16. A system for processing data relating to transactions, comprising:

an input device for providing transaction information describing the transactions, each transaction comprising a respective set of items, and a processor communicatively coupled to the input device that:

generates a computer data structure representing a prefix tree based on the transaction information, nodes of the prefix tree representing respective items, and branches of the prefix tree representing respective frequent itemsets occurring in the transactions, the generation resulting in prefix tree information, assigns a transaction group identifier for each prefix tree node representing an item, and associates the transaction group identifier of each leaf node with identifiers of transactions comprising items represented by nodes of a prefix tree branch ending at the leaf node, for associating the transaction group identifier of each non-leaf node with transaction group identifiers of direct child nodes of the non-leaf node and with identifiers of transactions, comprising items represented by respective nodes of a prefix tree branch ending at the non-leaf node, the associations resulting in transaction group information describing associations between the transaction group identifiers and the identifiers of the transactions.

17. The system of claim 16, further comprising a memory communicatively coupled to the processor that stores the prefix tree information, information about assigning the transaction group identifiers to the prefix tree nodes, and the transaction group information.

18. The system of claim 17, in which the memory is at least one of an electronic device, a magnetic device, an optical device, an electromagnetic device, an infrared device, and a semiconductor device.

19. The system of claim 17, in which the memory is at least one of an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, and a magnetic storage device.

20. The system of claim 16, in which the processor further receives prefix tree information, transaction group identifier assignment information, and transaction group information, in which:

the prefix tree information represents a prefix tree, nodes of the prefix tree representing respective items in the transactions, and branches of the prefix tree representing respective frequent itemsets occurring in the transactions, the transaction group identifier assignment information indicates a transaction group identifier assigned for each prefix tree node representing an item, the transaction group information provides associations of the transaction group identifier of each leaf node with identifiers of transactions comprising items represented by nodes of a prefix tree branch ending at the leaf node and provides associations of the transaction group identifier of each non-leaf node with transaction group identifiers of direct child nodes of the non-leaf node and with identifiers of transactions, comprising items represented by nodes of a prefix tree branch ending at the non-leaf node, sorts a set of items of an association rule in accordance with an order used for the prefix tree resulting in a sorted set of items, determines an end node of a branch of the prefix tree representing a frequent itemset corresponding to the sorted set of items, and determines which transactions support the association rule by determining which transaction identifiers are associated with the transaction group identifier of the end node based on the transaction group information.

21. The sys of claim 20, further comprising an output device that provides information indicating the transactions supporting the association rule.

22. The system of claim 16, in which the input device is at least one of a keyboard, a mouse, a sensor, a separate computer processing device, and a network device communicatively coupled to the processor.

23. The system of claim 16, in which the processor associates said transaction group identifier of each non-leaf node with transaction group identifiers of direct child nodes of said non-leaf node and with identifiers of transactions if said non-leaf node has a direct child node.

24. A computer program product for processing data relating to transactions, comprising:

a computer readable storage medium having computer usable program code embodied therewith, in which the computer usable program code:

generates a computer data structure representing a prefix tree based on transaction information describing a number of transactions, each transaction comprising a respective set of items, nodes of the prefix tree representing respective items, and branches of the prefix tree representing respective frequent itemsets occurring in the transactions, the generation resulting in prefix tree information, assigns a transaction group identifier for each prefix tree node representing an item, associates the transaction group identifier of each leaf node with identifiers of transactions comprising items represented by nodes of a prefix tree branch ending at the leaf node, and associates the transaction group identifier of each non-leaf node with transaction group identifiers of direct child nodes of the non-leaf node and with identifiers of transactions, comprising items represented by nodes of a prefix tree branch ending at the non-leaf node, the associations resulting in transaction group information describing associations between the transaction group identifiers and the identifiers of the transactions.

25. The computer program product of claim 24, in which the computer usable program code further stores the prefix tree information, information about assigning the transaction group identifiers to the prefix tree nodes, and the transaction group information.

* * * * *